UNITED STATES PATENT OFFICE.

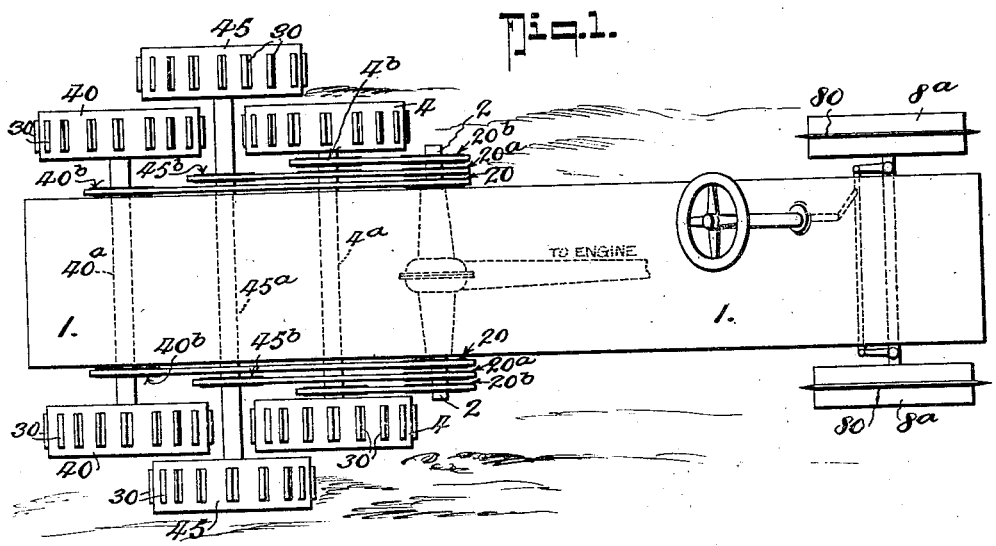
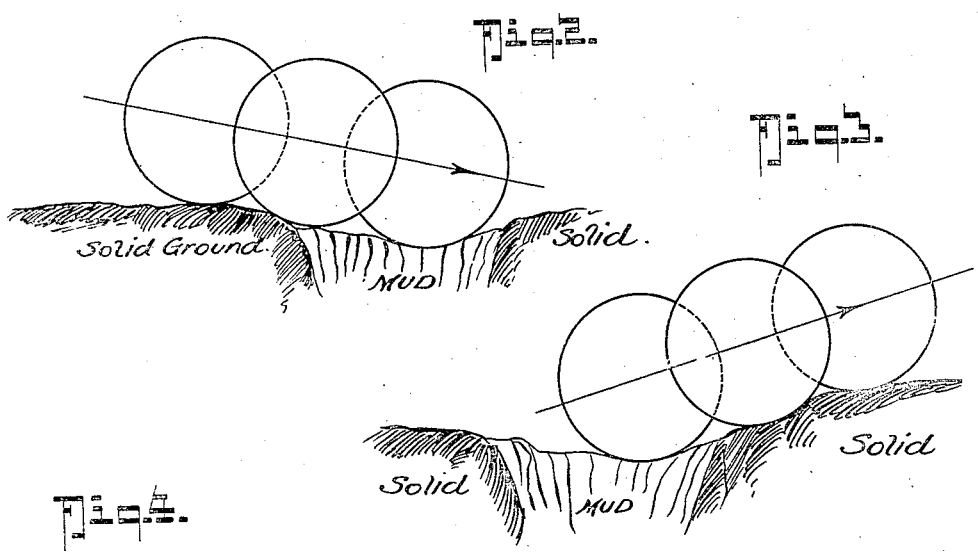

GEORGE B. WHITCOMB, OF MORGAN, OREGON.

TRACTOR-ENGINE.

1,239,328.  Specification of Letters Patent.  Patented Sept. 4, 1917.

Application filed September 11, 1916. Serial No. 119,483.

*To all whom it may concern:*

Be it known that I, GEORGE B. WHITCOMB, residing at Morgan, in the county of Morrow and State of Oregon, have invented certain new and useful Improvements in Tractor-Engines, of which the following is a specification.

This invention has reference to improvements in motor vehicles and particularly to tractor mechanism adapted for being readily applied to second hand or worn out auto vehicles, and particularly designed for being used in connection with the differential or jack shaft of such vehicles.

The primary object of my invention is to provide a tractor mechanism embodying a plurality of grousers or tractor wheels upon each side of the frame or chassis of the machine, adapted for being coupled up with the motor vehicle jack shaft, and arranged in relative staggered relation, whereby some of the tractor wheels travel out of alinement with the remaining wheels to thereby not only effectively provide for the required propulsion of the machine, but also, while diminishing speed provide for an increased traction power.

Another object of my invention is to provide an improved arrangement of tractors especially adapted for passing over ordinary obstructions, such as are encountered in tractor work, and with the said tractor members in such close relation, that the front or steering wheels will bring the machine around as the tractors are kept on top of the soft earth and from getting down into holes.

With other objects in view that will hereinafter fully appear, my invention consists in the peculiar construction and novel arrangement of parts, first fully set out in the following description, specifically pointed out in the appended claim, and illustrated in the accompanying drawings, in which:

Figure 1 is a diagrammatic plan view of the motor vehicle with my improved arrangement of tractor wheels applied.

Fig. 2 is a diagrammatic side view of one set of the tractor wheels arranged as shown in Fig. 1 and illustrates the manner in which the said wheels approach and pass over a mud hole.

Fig. 3 is a similar view that illustrates how the tractor wheels pass from the mud hole back upon the solid ground.

Fig. 4 is a diagrammatic plan view that illustrates a modified arrangement of the plurality of sets of tractors and hereinafter specifically referred to.

In the practical application of my improved arrangement of tractors for motor vehicles, and in the preferred method of operatively assembling the same, I utilize second-hand, out-of-date automobiles, employing the differential or rear axle, (after removing the usual pneumatic tire driving wheels) as a jack shaft for transmitting power to the tractors.

In the drawing, which diagrammatically illustrates a motor vehicle body, the frame or chassis 1 is extended rearwardly from the rear axle or jack shaft, 2, to provide for the required bearings for the several transverse shafts, that carry, at their ends, the several sets of grousers or traction wheels. In the preferred arrangement of my invention, I provide a plurality of tractor wheels at each side of the machine, which, when arranged as shown in Fig. 1, comprise a pair of wheels 4—40 located one to the rear of the other and in longitudinal alinement, and another wheel 45 that is arranged midway of the two wheels 4—40, parallel with but positioned beyond the outer face of the said wheels 4 and 40.

The several sets of wheels 4—40—45 have their axles $4^a$—$40^a$—$45^a$ each provided with a sprocket gear $4^b$—$40^b$—$45^b$ and which are driven through endless chain drives that take around driver gears $20^a$—$20^b$—20 on each end of the jack shaft 2 that receives power from the engine in the usual manner.

To obtain good results, the several tractors 4—40—45, at each side of the machine, are bunched as closely together as possible, with the face or tread portions of the said wheels preferably of a width equal to one-third of their diameter and with one inch wide face lugs 30—30 on their outer face to keep the said wheels from slipping laterally.

$8^a$ designate the front or steering wheels, which are also in the nature of solid rim tractors that are substituted for the usual rubber tire wheels when my improvements are applied to an old motor vehicle, and to prevent side slipping, each front tractor wheel has an annular face lug 80.

By reason of providing a plurality of tractor wheels at each side of the rear end of the frame and arranging the said wheels in a close but staggered manner, as shown and described, advantages in tractor construction is obtained over the usual arrangement of tractor wheels, since in my construction of tractors, an increased traction surface is obtained and by having the rear tractor wheels arranged as shown and spaced a reasonably long distance from the steering wheels, a machine equipped with my system of tractor wheels will steer as well as machines of the caterpillar type.

By arranging the tractors in staggered relation, as shown and described, in passing over soft ground or mud holes, while the front one of the set of tractors may be passing down into the mud hole or soft earth, the other or rear wheel that runs in alinement with the front wheel may yet be on solid ground (see Fig. 2) and as the rear wheel passes down into the mud hole or soft ground the front wheel may be again riding upon solid ground, and since the intermediate tractor wheel is positioned laterally of the front and rear alining wheel, it follows that the said wheel during the passing of the front and rear wheels over a soft spot or mud hole, may be traveling on hard ground.

While I have described as the preferred form the arrangement of the tractor wheels shown in Fig. 1, the said tractors or drivers may be assembled as diagrammatically illustrated in Fig. 4 of the drawing, it being understood that 8, 10 or more drivers, coupled up close in any form that they may be bunched, may be used, so long as the several members of each set of tractor wheels have a staggered relation and are coupled together and driven from the jack shaft.

While I have described the power transmission from the jack shaft as adapted for transmitting motion to all of the several sets of wheels in unison and in like directions, it is understood that as the vehicle turns the differential works in the jack shaft as usual to allow the sets of wheels at one side to turn faster than the sets of wheels on the opposite side.

What I claim is:

As an improvement in motor vehicles; the combination with the vehicle frame, the motor and the driven jack shaft; of sets of pairs of tractor wheels mounted on the machine frame at the rear of the jack shaft, power transmission connecting the said pairs of wheels and the jack shaft for transmitting motion to all of the wheels in like direction except when turning the wheels, the several pairs of wheels being held in close and staggered relation, several of the pairs of each set of wheels being located in alinement, with one pair of said alining wheels in advance of the remaining set of wheels, and the other pair of said alining wheels located to the rear of the said remaining set of wheels.

GEORGE B. WHITCOMB.